(12) United States Patent
Baumann et al.

(10) Patent No.: US 10,843,578 B2
(45) Date of Patent: Nov. 24, 2020

(54) CONFIGURATION FOR BATTERY POWERED ELECTRIC DRIVE LOAD HAUL DUMP

(71) Applicant: Caterpillar Inc., Deerfield, IL (US)

(72) Inventors: Jonathan M. Baumann, Hanna City, IL (US); Edward L. Zwilling, Washington, IL (US); Andrew Ellis Diecker, Metamora, IL (US); Thomas Michael Sopko, Jr., East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 63 days.

(21) Appl. No.: 16/362,188

(22) Filed: Mar. 22, 2019

(65) Prior Publication Data

US 2020/0298713 A1 Sep. 24, 2020

(51) Int. Cl.

| | |
|---|---|
| *B60L 50/60* | (2019.01) |
| *H02J 7/14* | (2006.01) |
| *H02J 7/00* | (2006.01) |
| *B60R 16/023* | (2006.01) |
| *B60L 53/16* | (2019.01) |
| *E02F 9/20* | (2006.01) |
| *E21F 13/06* | (2006.01) |
| *H02P 27/06* | (2006.01) |

(52) U.S. Cl.
CPC ............. *B60L 50/66* (2019.02); *B60L 53/16* (2019.02); *B60R 16/0238* (2013.01); *E02F 9/207* (2013.01); *E02F 9/2091* (2013.01); *H02J 7/0045* (2013.01); *H02J 7/1423* (2013.01); *B60L 2210/10* (2013.01); *B60Y 2200/415* (2013.01); *B60Y 2200/91* (2013.01); *B60Y 2300/91* (2013.01); *E21F 13/063* (2013.01); *H02P 27/06* (2013.01)

(58) Field of Classification Search
CPC combination set(s) only.
See application file for complete search history.

(56) References Cited

U.S. PATENT DOCUMENTS

| | | | |
|---|---|---|---|
| 5,254,930 A | * | 10/1993 | Daly ..................... H02J 7/0026 320/119 |
| 7,135,836 B2 | | 11/2006 | Kutkut et al. |
| 8,378,623 B2 | | 2/2013 | Kusch et al. |
| 8,714,289 B2 | | 5/2014 | Olsen et al. |
| 8,836,289 B2 | | 9/2014 | Flett |

(Continued)

*Primary Examiner* — Adam D Houston
(74) *Attorney, Agent, or Firm* — Miller, Matthias & Hull

(57) ABSTRACT

An electric drive work machine may include a body frame, a first electric power storage device mounted on the body frame, a second electric power storage device mounted on the body frame, and a junction box mounted on the body frame. The junction box may be operatively connected to the first electric power storage device by a first electric connection having a first inductance, and operatively connected to the second electric power storage device by a second electric connection having a second inductance. The first inductance may be equal to the second inductance such that power source charging power from the junction box is distributed equally to the first electric power storage device and the second electric power storage device, and power source output power to the junction box is drawn equally from the first electric power storage device and the second electric power storage device.

20 Claims, 3 Drawing Sheets

(56) References Cited

U.S. PATENT DOCUMENTS

| | | | |
|---|---|---|---|
| 8,994,338 B2 | 3/2015 | Khan et al. | |
| 2009/0230092 A1* | 9/2009 | Hashimoto | B23H 7/04 |
| | | | 219/69.13 |
| 2011/0046905 A1* | 2/2011 | Blade | H02J 7/0021 |
| | | | 702/63 |
| 2011/0304298 A1 | 12/2011 | Gow et al. | |
| 2012/0166031 A1* | 6/2012 | Nishida | H02J 7/0014 |
| | | | 701/22 |
| 2013/0088197 A1 | 4/2013 | Kim et al. | |
| 2014/0112504 A1* | 4/2014 | Waale | H04R 7/08 |
| | | | 381/152 |
| 2014/0175871 A1* | 6/2014 | Kim | B60L 58/15 |
| | | | 307/10.1 |
| 2015/0340765 A1* | 11/2015 | Dang | H01Q 21/0075 |
| | | | 343/893 |
| 2016/0055841 A1* | 2/2016 | Ulbrick | G10H 3/143 |
| | | | 84/728 |
| 2016/0164316 A1 | 6/2016 | Shizuno et al. | |
| 2016/0167536 A1 | 6/2016 | Lasagni | |
| 2017/0015397 A1 | 1/2017 | Mitchell et al. | |
| 2017/0126115 A1* | 5/2017 | Schulz | B60L 3/0038 |
| 2018/0143625 A1 | 5/2018 | Nelson et al. | |
| 2018/0320402 A1* | 11/2018 | Evans | B60L 53/00 |
| 2019/0088568 A1* | 3/2019 | Ishino | H01L 25/07 |
| 2019/0178960 A1* | 6/2019 | Halperin | G01R 33/287 |
| 2019/0363563 A1* | 11/2019 | Zhang | B60L 1/02 |
| 2019/0375282 A1* | 12/2019 | Lee | H01M 8/04029 |
| 2020/0070757 A1* | 3/2020 | Paquette | H02J 7/14 |
| 2020/0139843 A1* | 5/2020 | Park | B60L 53/62 |
| 2020/0148070 A1* | 5/2020 | Takebayashi | H02J 7/342 |
| 2020/0157769 A1* | 5/2020 | Huff | E02F 9/20 |
| 2020/0189379 A1* | 6/2020 | Hirukawa | B60K 1/04 |
| 2020/0203688 A1* | 6/2020 | Kinoshita | H01M 2/024 |

* cited by examiner

CONFIGURATION FOR BATTERY POWERED ELECTRIC DRIVE LOAD HAUL DUMP

TECHNICAL FIELD

The present disclosure relates generally to electric drive work machines and, more particularly, to battery powered electric drive systems for electric drive work machines that balance the charging power delivered to and the output power drawn from power storage devices of the system.

BACKGROUND

Mechanical diesel powered work machines produce diesel particulates and emissions. In open work areas, the emissions from the diesel powered work machines are dissipated into the atmosphere and do not accumulate around the work machine in high concentrations that are dangerous to operators. In contrast, in closed work areas such as mines, the emissions can build up within the closed work areas, and ventilation must be provided to prevent hazardous conditions. Battery powered electric drive work machines are being developed as alternatives to the diesel powered work machines for underground mining in order to reduce required mine ventilation. The electric drive work machines also produce less heat such that the closed work area can remain cooler than with diesel powered work machines. Such electric drive work machines make viable the extraction of ore bodies from mining locations where it would not be economically feasible to install ventilation and cooling systems necessary for the use diesel powered work machines within the closed work areas.

Battery systems for the battery powered electric work machines require sufficient on-board energy for the work machine to be productive for long enough work periods before batteries require recharging to make the use of the work machines economically feasible. Available space for packing the battery, electric drive and auxiliary systems on battery powered work machines is limited. Packing the electric drive components (motors, inverter, cables and the like) and the battery system is a critical part of the battery powered work machine's ability to meet performance targets. Leveraging of existing components (axles, shafts, HVAC systems and the like) is important for providing parts and product support for both existing work machines and work machines converted to be electrically powered.

SUMMARY OF THE DISCLOSURE

In one aspect of the present disclosure, an electric drive work machine is disclosed. The electric drive work machine may include a body frame, a first electric power storage device mounted on the body frame, a second electric power storage device mounted on the body frame, and a junction box mounted on the body frame. The junction box may be operatively connected to the first electric power storage device by a first electric connection having a first inductance, and operatively connected to the second electric power storage device by a second electric connection having a second inductance. The first inductance may be equal to the second inductance such that power source charging power from the junction box is distributed equally to the first electric power storage device and the second electric power storage device, and power source output power to the junction box is drawn equally from the first electric power storage device and the second electric power storage device.

In another aspect of the present disclosure, a method for symmetrically charging a first electric power storage device and a second electric power storage device of an electric drive work machine is disclosed. The method may include mounting a junction box on the electric drive work machine, mounting the first electric power storage device on the electric drive work machine, mounting the second electric power storage device on the electric drive work machine, connecting the first electric power storage device to the junction box with a first electric connection having a first inductance, and connecting the second electric power storage device to the junction box with a second electric connection having a second inductance that is equal to the first inductance. The method may further include providing power source charging power to the junction box, wherein the junction box, the first electric connection and the second electric connection distribute the power source charging power equally to the first electric power storage device and the second electric power storage device.

In a further aspect of the present disclosure, an electric drive work machine is disclosed. The electric drive work machine may include a body frame, a first electric power storage device mounted on the body frame, a second electric power storage device mounted on the body frame, and a junction box mounted on the body frame. The junction box may be operatively connected to the first electric power storage device by a first electric connection having a first inductance, and operatively connected to the second electric power storage device by a second electric connection having a second inductance. The electric drive work machine may also include an inverter operatively connected to the junction box, where the first inductance is equal to the second inductance, a traction motor operatively connected to the inverter and having a traction motor output shaft, a drivetrain operatively connected to the traction motor output shaft, and a first charging port operatively connected to the junction box. Power source charging power transferred from either the inverter or the first charging port to the junction box is distributed equally to the first electric power storage device and the second electric power storage device, and power source output power from transferred from the first electric power storage device and the second electric power storage device through the junction box to the inverter is drawn equally from the first electric power storage device and the second electric power storage device.

Additional aspects are defined by the claims of this patent.

DETAILED DESCRIPTION

Figure 1:
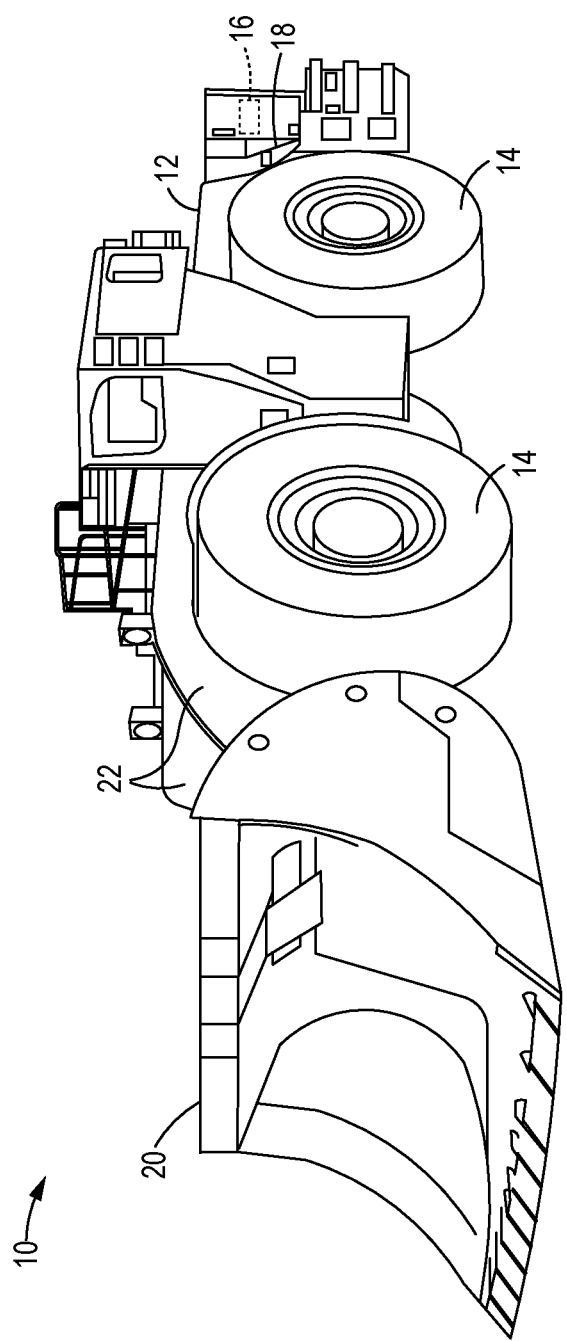
FIG. 1 is a perspective view of an exemplary electric drive work machine in which battery powered electric drive systems in accordance with the present disclosure may be implemented.

FIG. 1 illustrates an exemplary electric drive work machine 10 in which battery powered electrical drive systems in accordance with the present disclosure may be implemented. The work machine 10 may be, but is not limited to, an underground mining machine such as an underground load-haul-dump (LHD) loader or an underground mining truck as illustrated in FIG. 1, a backhoe loader, a skid steer loader, a wheel loader, a material loader, a motor grader, a track-type tractor, or an articulated truck, to name a few types of machines that may be employed at a worksite and in which the battery powered electrical drive systems in accordance with the present disclosure may be implemented.

The work machine 10 may include a body frame 12, and may be supported on the ground by a plurality of wheels 14 as illustrated, or track assemblies, skids or the like, that may be used to propel the work machine 10 over a work surface. A battery powered electric drive system 16 in accordance with the present disclosure may provide power to the wheels 14 via a mechanical or electromechanical drivetrain 18. The work machine 10 may further include an implement 20 that may be used to manipulate and/or transport work material at a worksite. As illustrated, the work machine 10 is an underground LHD loader 10 wherein the implement 20 is a bucket that is mounted to the body frame 12 by a pair of lift arms 22. However, those skilled in the art will understand that the teachings of the present disclosure may be implemented in other types of work machines such as those listed above for example.

The exemplary work machine 10 may be operated in one or more alternative work modes to perform tasks at a worksite. The work machine 10 may have a manual mode where the work machine 10 is operated manually by an operator disposed in a cab 24 on the work machine 10. In a tele-remote mode, the work machine 10 may be operated remotely by an operator using video, audio or other positioning and machine-related information to guide and control the work machine 10. In a line of site (LOS) mode, an operator may operate the machine remotely using a mobile (e.g., handheld) remote control device within line of sight of the work machine 10. A semi-autonomous mode may allow a remote operator to operate the work machine 10 semi-autonomously using video, audio or other positioning information and machine information to guide the work machine 10 as well as utilizing autonomous control for selected functions/operations of the work machine 10. In autonomous mode, the work machine 10 may be operated autonomously by a computer or computer system.

Figure 2:
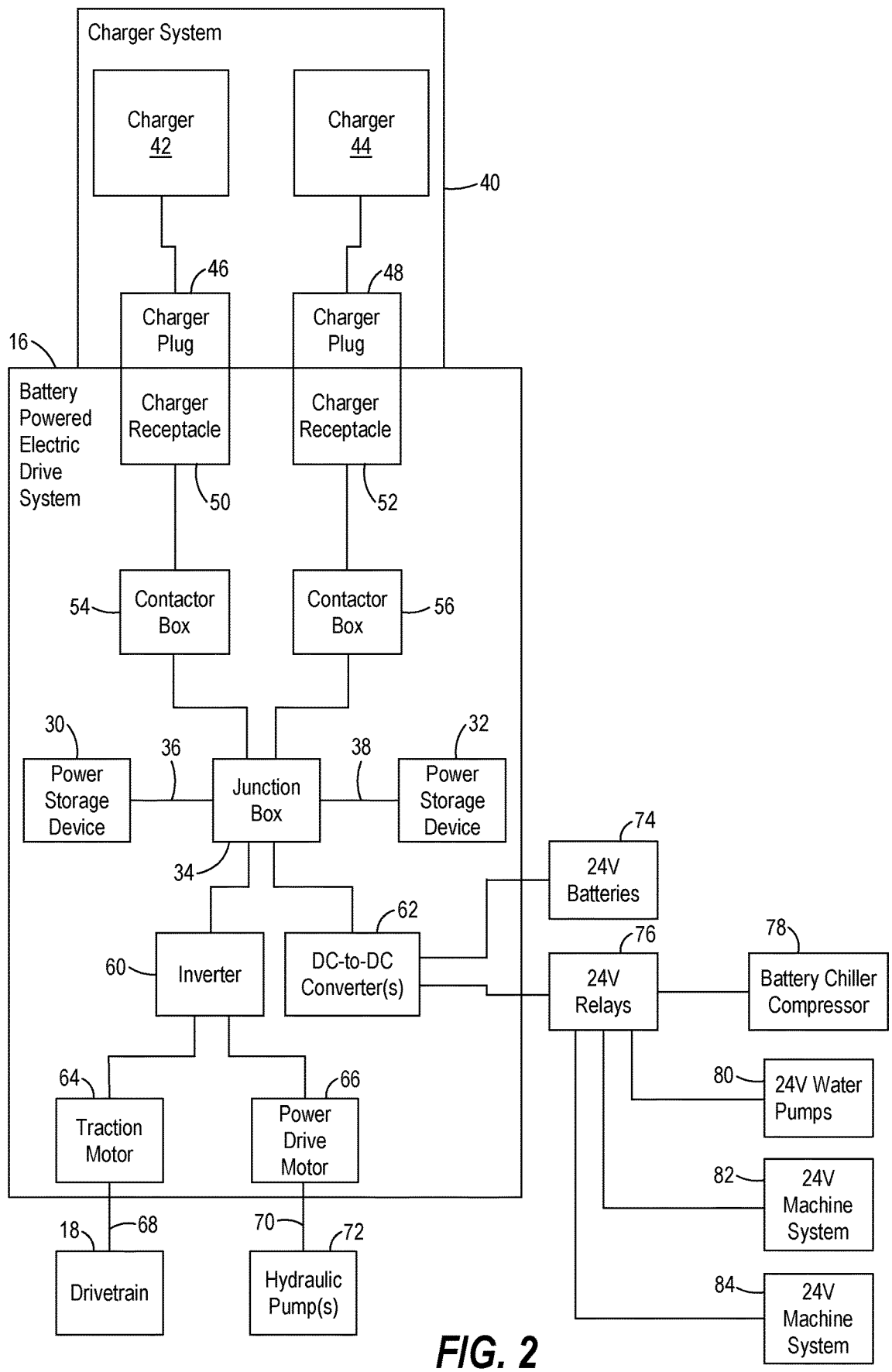
FIG. 2 is a schematic illustration of the battery power electric drive system in accordance with the present disclosure implemented in the work machine of FIG. 1 and connected to an exemplary charger system.

FIG. 2 is a schematic illustration of an exemplary embodiment of the battery powered electric drive system 16 implemented in the electric drive work machine 10 of FIG. 1. The battery powered electric drive system 16 may include a first electric power storage device 30 and a second electric power storage device 32 mounted on or within the body frame 12. The power storage devices 30, 32 may be any appropriate electrical storage medium that can be charged with, and can discharge, electric power. The power storage devices 30, 32 have substantially the same construction and capacity such that the power storage devices 30, 32 have similar performance when charging and discharging. In one embodiment, the power storage devices 30, 32 may each be a battery pack having five battery strings of battery cells enclosed within a battery case and connected in parallel. In alternative embodiments, the power storage devices 30, 32 may have greater or fewer than five battery strings of battery cells depending on the power requirements for a particular implementation in a work machine 10. In this configuration, the battery packs 30, 32 may have internal redundancy in the event that one or more of the battery strings fail during operation of the work machine 10 so that the remaining battery strings can power the work machine 10 to a maintenance area for repair. The power storage devices 30, 32 also provide redundancy for each other in the event that one of the power storage devices 30, 32 fails. The implementation of the power storage devices 30, 32, particularly high power and high energy battery systems, may include an integrated battery management system (BMS) (not shown) for power management and to insure safe operation. The BMS may be configured to detect fault conditions in the power storage devices 30, 32 and intervene if necessary to take the faulty power storage device 30, 32 off line to avoid further complications to the components of the work machine 10 until the power storage device 30, 32 can be repaired or replaced.

The battery powered electric drive system 16 further includes a junction box 34 mounted in or on the body frame 12. The first power storage device 30 may be connected to the junction box 34 by a first electric connection 36, and the second power storage device 32 may be connected to the junction box 34 by a second electric connection 38. As discussed further below, the first electric connection 36 may have a first inductance and the second electric connection 38 may have a second inductance that is equal to the first inductance such that power source charging power provided to the junction box 34 is distributed equally to the power storage devices 30, 32 when the battery powered electric drive system 16 is connected to a charger system 40. Similarly, output power from the power storage devices 30, 32 may be drawn equally to the junction box 34 from the power storage devices 30, 32 due to the matched inductances of the electric connections 36, 38 when electric power is required to operate other systems of the work machine 10. In one embodiment, the junction box 34 may include a large copper bar (not shown) to which the electric connections 36, 38 are connected for evenly distributed flow of electricity between the junction box 34 and the power storage devices 30, 32. In alternative embodiments one or more additional power storage devices 30, 32 may be implemented in the work machine 10 to meet the power requirements for a particular implementation. Additional power storage devices 30, 32 installed in the work machine 10 will be connected to the junction box 34 with electric connections having inductances that are matched to the inductances of the electric connections 36, 38 so that the symmetry of the power supply system is maintained and output power is drawing equally from each of the power storage devices 30, 32.

In order to receive electric power and charge the power storage devices 30, 32, the battery powered electric drive system 16 is configured for connection to charging systems such as the illustrated charger system 40. The charger system 40 may be a permanently installed station to which the work machine 10 must be driven, or a portable station such as a portable generator that may be transportable to the location of the work machine 10. Moreover, the charger system 40 is capable of outputting charging power at currents and voltages that are compatible with the power storage devices 30, 32. The illustrated charger system 40 is a dual charger system having multiple external power sources for the work machine 10 such as a first charger 42 and a second charger 44. Each charger 42, 44 has a corresponding charger plug 46, 48 at which the charging power is output. The charger plugs 46, 48 are configured to be connected to an apparatus that will receive the power output by the chargers 42, 44.

The battery powered electric drive system 16 is configured for attachment of one or more charging devices to charge the power storage devices 30, 32. The battery powered electric drive system 16 may be configured with an appropriate number of charger connections for efficiently charging the power storage devices 30, 32 in a particular implementation of the work machine 10. The illustrated battery powered electric drive system 16 is configured for two charging connections. Charging ports such as a first charger receptacle 50 and a second charger receptacle 52 are installed on the body frame 12 in a manner that facilitates connection of the charger plugs 46, 48.

Each charging port or charger receptacle 50, 52 is connected to the junction box 34 by a contactor box 54, 56, respectively. The contactor boxes 54, 56 provide switches that close to connect the charger receptacles 50, 52 to the junction box 34 when the charger plugs 46, 48 are connected and the chargers 42, 44 are outputting charging power. As charging power is transmitted through the first charger receptacle 50, the second charger receptacle 52, or both, the junction box 34 distributes the charging power equally to the power storage devices 30, 32, and to any additional power storage devices 30, 32 that may be implemented in the work machine 10 as discussed above. While two charger receptacles 50, 52 are illustrated with the battery powered electric drive system 16, those skilled in the art will understand that a single charging port or more than two charging ports may be implemented and connected to the junction box 34 depending on the capacities of the power storage devices 30, 32, the available charger systems 40, the power requirements of the work machine 10, the desired charging time for replenishing the power storage devices 30, 32 and other factors, and such alternative configurations are contemplated by the inventors.

The work machine 10 will have various electrical and electromechanical systems requiring power from the power storage devices 30, 32. As illustrated, the junction box 34 facilitates the transfer of output power from the power storage devices 30, 32 to such systems. In most instances, DC power from the power storage devices 30, 32 must be converted to the power that is required to operate the other systems. As shown, the battery powered electric drive system 16 includes an inverter 60 and a DC-to-DC converter 62 operatively connected to the junction box 34. The inverter 60 is configured to convert the DC power output by the power storage devices 30, 32 into AC power needed to operate AC devices such as a traction motor 64 and a pump drive motor 66. The traction motor 64 may convert the electrical power from the power storage devices 30, 32 and through the inverter 60 into mechanical power at a traction motor output shaft 68 to drive the drivetrain 18 that is operatively connected to the wheels 14 to propel the work machine 10. The pump drive motor 66 may convert the electrical power from the power storage devices 30, 32 and through the inverter 60 into mechanical power at a pump drive motor output shaft 70 to drive one or more hydraulic pumps 72 that will provide pressurized fluid to hydrodynamic systems such as steering control systems, that will turn the wheels 14, and hydraulic cylinders (not shown) that raise and lower the lift arms 22 and articulate the implement 20. Those skilled in the art will understand that other types of motors may be used to provide mechanical power to the drivetrain 18 and the hydraulic pumps 72, and such devices are contemplated. For example, DC motors or switched reluctance motors may be implemented in the work machine 10. Such alternative motors may be connected to the junction box 34 via appropriate inverters, DC-to-DC converters and the like that can convert the DC power from the power storage devices 30, 32 to the power necessary to drive the alternative motors.

The DC-to-DC converter 62 is configured to convert the high voltage DC power output by the power storage devices 30, 32 into lower voltage DC power that is usable by the electrical systems of the work machine 10. In one exemplary implementation, the power storage devices 30, 32 store DC power with a 715V nominal voltage that must be converted into a 24V output voltage. The DC power output from the DC-to-DC converter 62 may be transferred to a 24V batteries 74 that can be charged for use as a backup to the power storage devices 30, 32 or as an alternative lower voltage source so that the power in the power storage devices 30, 32 can be saved for driving the work machine 10. The DC power output can also be transferred through 24V relays 76 connected to the DC-to-DC converter 62 directly to other systems such as a battery chiller compressor 78 used in cooling the power storage devices 30, 32, water pumps 80 that use DC power, and other lower voltage machine systems 82, 84.

As discussed above, the battery powered electric drive system 16 is configured so that power is distributed to and drawn equally from the power storage devices 30, 32. The even flow of power to and from the power storage devices 30, 32 is facilitated by the power storage devices 30, 32 having the same configuration (capacity, connections, etc.), and the electric connections 36, 38 between the power storage devices 30, 32, respectively, and the junction box 34 having the same inductance. The first power storage device 30 and the first electric connection 36, and the second power storage device 32 and the second electric connection 38, are mirror images from an electrical perspective and appear to the junction box 34 to be equal loads. This equivalence results in even power transfer to and from the power storage devices 30, 32.

Assuming the power storage devices 30, 32 are essentially identical and present the same load to the junction box 34, matching the inductances of the electric connections 36, 38 creates equal flow between the power storage devices 30, 32 and the junction box 34. Generally, electricity has a preference to flow to the lower inductance path. The inductances can be matched by manipulation of parameters that affect the inductance, such as the material from which the electric connections 36, 38 are fabricated, the length and gauge of the wires used to form the electric connections 36, 38, the presence of any discontinuities such as crimps, junctions or connections in the wires, and the like. Generally, the electric connections 36, 38 will be fabricated using the same conductive material, such as copper, so other parameters may be manipulated to match the inductances.

In a simple implementation, the power storage devices 30, 32 may be located on the body frame 12 symmetrically about the junction box 34 as suggested in FIG. 2. The symmetrical arrangement may be preferable from a performance standpoint by balancing the weight across the work machine 10. In this configuration, the power storage devices 30, 32 may be equidistant from the junction box 34 such that the electric connections 36, 38 can have the same length, gauge and presence or absence of crimps or junctions, and correspondingly will have matching inductances.

If the power storage devices 30, 32 cannot be placed equidistant from the junction box 34, or if direct paths from the power storage devices 30, 32 to the junction box 34 are not available due to the packaging of other components of the work machine 10, the parameters of the electric connections 36, 38 can be manipulated to match the inductances. For example, if a minimum connection length for running the first electric connection 36 is greater than the connection length for the second electric, the second electric connection 38 can be lengthened to match the length of the first electric connection 36. If the minimum collection lengths are significantly different, the wire gauge in the longer of the electric connections 36, 38 could be increased relative to the wire gauge in the shorter of the electric connections 36, 38 to decrease the inductance in the longer of the electric connections 36, 38. Alternatively, or in combination, a crimp, junction or other discontinuity can be added to the shorter of the electric connections 36, 38 to increase its inductance. Other strategies for manipulating the parameters of the electric connections 36, 38 to match the inductances of the electric connections 36, 38 will be apparent to those skilled in the art and are contemplated by the inventors.

INDUSTRIAL APPLICABILITY

Figure 3:
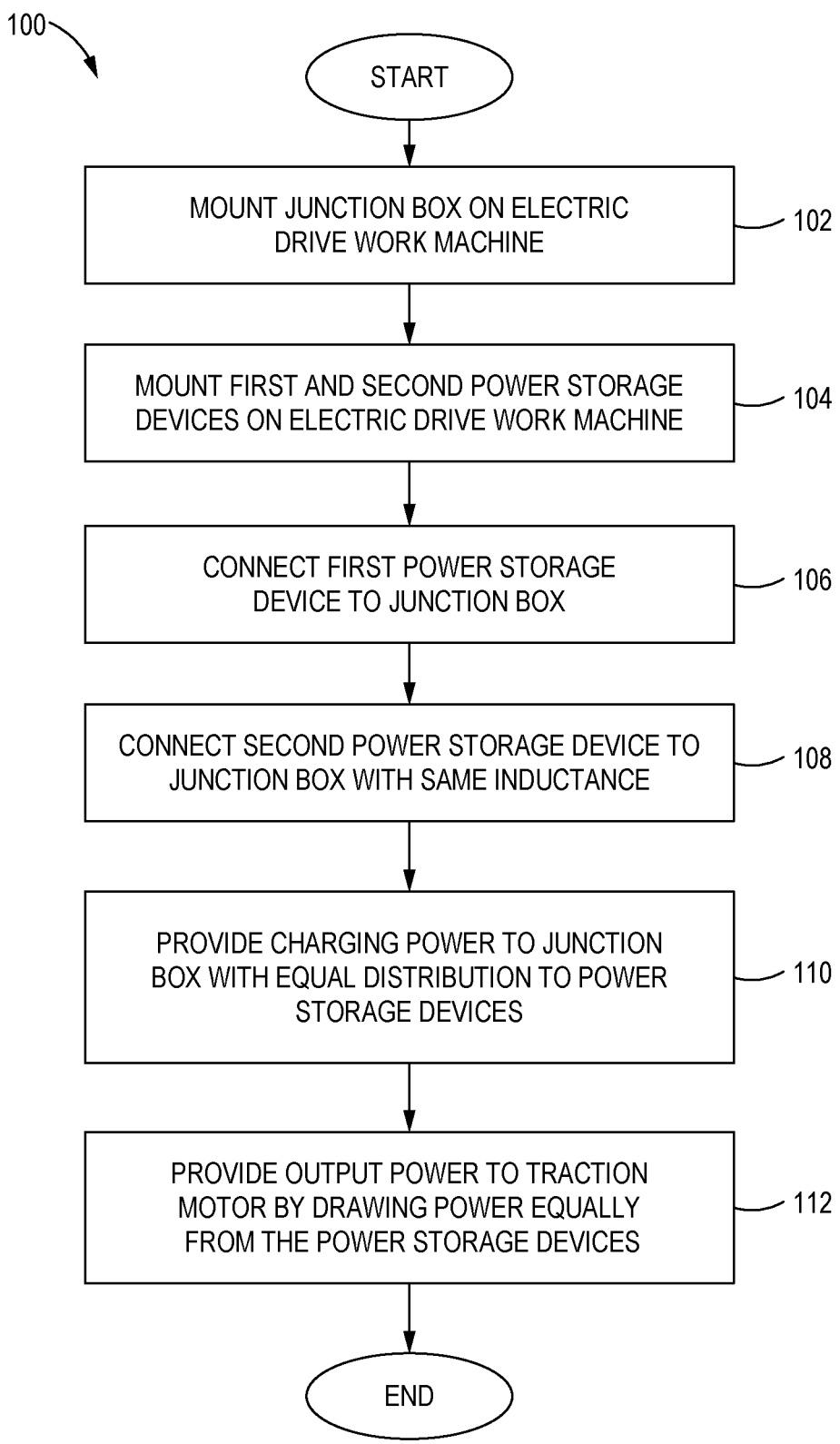
FIG. 3 is a flow diagram of a symmetrical charging and discharging routine for the battery power electric drive system in accordance with the present disclosure implemented in the work machine of FIG. 1.

FIG. 3 illustrates a routine 100 for installing the power storage devices 30, 32 and the junction box 34, and symmetrically charging the power storage devices 30, 32 and discharging power from the power storage devices 30, 32. The routine 100 may begin at a block 102 where the junction box 34 is mounted on the body frame 12 of the electric drive work machine 10. The junction box 34 may be installed at a convenient location relative to the other components of the work machine 10, and in particular to the other components of the battery powered electric drive system 16. With the junction box 34 installed at the block 102, control may pass to a block 104 where the power storage devices 30, 32 are mounted on the body frame 12 of the work machine 10, also in locations that are convenient relative to the other components of the work machine 10 and to the junction box 34. Of course, those skilled in the art will understand that the power storage devices 30, 32 and the junction box 34 may be installed in any order, or installed together as a single prefabricated unit.

With the junction box 34 and the power storage devices 30, 32 installed on the work machine 10 at the blocks 102, 104, control may pass to a block 106 where the first power storage device 30 is connected to the junction box 34 by the first electric connection 36. A first inductance of the first electric connection 36 will be determined by the parameters as discussed above. With the first power storage device 30 connected to the junction box 34 at the block 106, control may pass to a block 108 where the second power storage device 32 is connected to the junction box 34 by the second electric connection 38 with a second inductance that is equal to the first inductance of the first electric connection 36. As discussed above, the inductances can be matched by manipulating parameters such as the lengths of the electric connections 36, 38, the materials used, the wire gauges, discontinuities and the like.

After the power storage devices 30, 32 are connected to the junction box 34 at the blocks 106, 108, control may pass to a block 110 where charging power may be provided to the junction box 34 by the charger system 40. Because the power storage devices 30, 32 are connected to the junction box 34 with the same inductance and appear to be equivalent loads, both power storage devices 30, 32 have an equal opportunity to participate in power transfer from a device such as the charger system 40. The charging power is distributed equally to the power storage devices 30, 32, and the power storage devices 30, 32 will charge at the same rate so that the power stored in the power storage devices 30, 32 is balanced. The power storage devices 30, 32 may be charged to full capacity, or partially charged depending on the time required to charge the power storage devices 30, 32 and the time available to recharge the work machine 10.

After the work machine 10 is partially or fully charge at the block 110, control may pass to a block 112 where output power is drawn equally from the power storage devices 30, 32 and provided to the electrical and electromechanical systems of the work machine 10, such as to the traction motor 64 via the inverter 60 to drive the drive and 68. Similar to charging process, the identical configurations of the power storage devices 30, 32 and the matching inductances of the electric connections 36, 38 give the power storage devices 30, 32 equal opportunity to participate in providing power to the electrical and electromechanical systems. As the output power is drawn equally, the power stored in the power storage devices 30, 32 remains balanced as the power storage devices 30, 32 are drained to power the other systems. At some point, the power levels in the power storage devices 30, 32 will be reduced to the point that control may pass back to the block 110 to reconnect the work machine 10 to a charger system to receive charging power therefrom and recharge the power storage devices 30, 32.

The battery powered electric drive system 16 in accordance with the present disclosure can be effective in powering electric drive work machines 10 in confined environments, such as mines, as well as outdoor worksites. Replacing an internal combustion engine with the battery powered electric drive system 16 reduces potentially harmful emissions from the electric drive work machine 10. The electric drive work machine 10 will also have reduced outputs or heat and humidity, and will reduce the noise at the worksite.

The symmetrical design of the battery powered electric drive system 16 provides benefits in the packaging of the components of the work machine 10, in addition to improvements in operation. Implementing multiple smaller power storage devices 30, 32 as an alternative to a single large power storage device allows the weight of the power storage devices 30, 32 to be distributed more efficiently around the work machine 10 instead of concentrating the weight at a location that may not be centered on the work machine 10. The smaller packaging of the individual power storage devices 30, 32 may also facilitate efficient arrangement of other components of the work machine 10.

On the operational side, the symmetric design may extend the useful life of the individual power storage devices 30, 32. Matching the configurations of the power storage devices 30, 32 and the inductances of the electric connections 36, 38 to the junction box 34 results in the power storage devices 30, 32 charging and discharging at the same rate. Neither of the power storage devices 30, 32 bears a disproportionate share of powering the work machine 10. The power storage devices 30, 32 cycle through charging and discharging together. This should allow the power storage devices 30, 32 to degrade at the same rate and reach the ends of their useful lives at approximately the same time. Two spent power storage devices 30, 32 can be replaced at the same time as opposed to replacing one spent power storage device and having to decide whether to replace the partially spent device or keep it and have it operate with the replacement device.

The symmetric design also provides redundancy in supplying power that may reduce instances of the work machines 10 becoming disabled and requiring maintenance in the middle of the worksite. The control systems of the work machine 10 may be configured to detect failures of the power storage devices 30, 32 using known monitoring strategies. If a failure of one power storage device 30, 32 is detected, the failing power storage device 30, 32 may be taken offline. The work machine 10 may then enter a limp mode where power is drawn from the functioning online power storage device 30, 32 to allow the work machine 10 to be driven from the worksite to a maintenance area where the battery powered electric drive system 16 can be services without interfering with other work machines 10 still operating at the worksite.

The battery powered electric drive system 16 also provides flexibility in arranging the work machine 10 for recharging the power storage devices 30, 32. Based on the requirements for a particular implementation, a single or multiple charger receptacles 50, 52 and corresponding contactor boxes 54, 56 may be implemented to control the flexibility and speed of recharging the power storage devices 30, 32. Each power storage device 30, 32 will receive an equal charge from any charger receptacle 50, 52, so chargers 42, 44 may be attached to either of the charger receptacles 50, 52, or to both. The ability to implement multiple charger receptacles 50, 52 may allow for fast charging of the power storage devices 30, 32 versus implementations where only a single hookup is provided.

In addition to using the charger receptacles 50, 52, movement of the wheels 14 and the drivetrain 18 due to other forces may be converted to electric power and delivered to the power storage devices 30, 32 to increase the stored power. Gravity or the momentum of the work machine 10 may drive the work machine 10 independent of output power from the traction motor 64 or other motor installed to drive the drivetrain 18. In such cases, the drivetrain 18 may drive the traction motor 64 to output AC power to the inverter 60. The inverter 60 then converts the AC power to DC power and outputs the DC power to the junction box 34 where the power will be split equally between the power storage devices 30, 32. Similarly, excess energy driving components fluidly connected to the hydraulic pumps 72 may be redirected to the power storage devices 30, 32 through the inverter 60. For example, hydraulic fluid pumped out of one end of a lift cylinder or cylinders for the lift arms 22 when the implement 20 is lowered by be redirected back to the corresponding hydraulic pump 72 to drive the hydraulic pump 72 and the power drive motor 66 to output AC power to the inverter 60 for conversion into DC power to charge the power storage devices 30, 32.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. An electric drive work machine comprising:
    a body frame;
    a first electric power storage device mounted on the body frame;
    a second electric power storage device mounted on the body frame; and
    a junction box mounted on the body frame, operatively connected to the first electric power storage device by a first electric connection having a first inductance, and operatively connected to the second electric power storage device by a second electric connection having a second inductance, where the first inductance is equal to the second inductance such that power source charging power from the junction box is distributed equally to the first electric power storage device and the second electric power storage device, and power source output power to the junction box is drawn equally from the first electric power storage device and the second electric power storage device.

2. The electric drive work machine in accordance with claim 1, wherein the first electric power storage device and the second electric power storage device are mounted on the body frame at equal distances from the junction box, wherein a first connection length of the first electric connection is equal to a second connection length of the second electric connection and a first connection wire gauge of the first electric connection is equal to a second connection wire gauge of the second electric connection.

3. The electric drive work machine in accordance with claim 1, wherein the first electric power storage device is disposed a first power source distance from the junction box and the second electric power storage device is disposed a second power source distance from the junction box that is not equal to the first power source distance, and a first connection length of the first electric connection is equal to a second connection length of the second electric connection.

4. The electric drive work machine in accordance with claim 1, wherein the first electric power storage device is disposed a first power source distance from the junction box and the second electric power storage device is disposed a second power source distance from the junction box that is not equal to the first power source distance, a first connection length of the first electric connection is not equal to a second connection length of the second electric connection, and a first connection wire gauge of the first electric connection is not equal to a second connection wire gauge of the second electric connection so that the first inductance is equal to the second inductance.

5. The electric drive work machine in accordance with claim 1, comprising:
    an inverter operatively connected to the junction box; and
    a traction motor operatively connected to the inverter and having a traction motor output shaft; and
    a drivetrain operatively connected to the traction motor output shaft, wherein, when the traction motor is operative to cause rotation of the traction motor output shaft to drive the drivetrain, the power source output power is drawn equally from the first electric power storage device and the second electric power storage device through the junction box to the inverter.

6. The electric drive work machine in accordance with claim 5, wherein, when the drivetrain is driven to cause rotation of the traction motor output shaft, the power source charging power generated by the traction motor and transferred by the inverter to the junction box is distributed equally to the first electric power storage device and the second electric power storage device.

7. The electric drive work machine in accordance with claim 1, comprising:
- a direct current-to-direct current converter operatively connected to the junction box; and
- a direct current powered system operatively connected to the direct current-to-direct current converter, wherein, when the direct current powered system is operative to draw direct current from the direct current-to-direct current converter, the power source output power is drawn equally from the first electric power storage device and the second electric power storage device through the junction box to the direct current-to-direct current converter.

8. The electric drive work machine in accordance with claim 1, comprising a first charging port operatively connected to the junction box, wherein, when a first external power source is connected to the first charging port to deliver the power source charging power to the electric drive work machine, the power source charging power from the first external power source to the junction box is distributed equally to the first electric power storage device and the second electric power storage device.

9. The electric drive work machine in accordance with claim 8, comprising a second charging port operatively connected to the junction box, wherein, when the first external power source is connected to the first charging port and a second external power source is connected to the second charging port to deliver the power source charging power to the electric drive work machine, the power source charging power from the first external power source and the second external power source to the junction box is distributed equally to the first electric power storage device and the second electric power storage device.

10. A method for symmetrically charging a first electric power storage device and a second electric power storage device of an electric drive work machine comprising:
- mounting a junction box on the electric drive work machine;
- mounting the first electric power storage device on the electric drive work machine;
- mounting the second electric power storage device on the electric drive work machine;
- connecting the first electric power storage device to the junction box with a first electric connection having a first inductance;
- connecting the second electric power storage device to the junction box with a second electric connection having a second inductance that is equal to the first inductance; and
- providing power source charging power to the junction box, wherein the junction box, the first electric connection and the second electric connection distribute the power source charging power equally to the first electric power storage device and the second electric power storage device.

11. The method for symmetrically charging in accordance with claim 10, wherein mounting the first electric power storage device and mounting the second electric power storage device comprise mounting the first electric power storage device and the second electric power storage device on a body frame of the electric drive work machine at equal distances from the junction box, and wherein a first connection length of the first electric connection is equal to a second connection length of the second electric connection.

12. The method for symmetrically charging in accordance with claim 10, wherein mounting the first electric power storage device and mounting the second electric power storage device comprise mounting the first electric power storage device and the second electric power storage device on a body frame of the electric drive work machine at different distances from the junction box, and wherein a first connection length of the first electric connection is equal to a second connection length of the second electric connection.

13. The method for symmetrically charging in accordance with claim 10, wherein a first connection length of the first electric connection is not equal to a second connection length of the second electric connection, and wherein a first connection wire gauge of the first electric connection is not equal to a second connection wire gauge of the second electric connection so that the first inductance is equal to the second inductance.

14. The method for symmetrically charging in accordance with claim 10, comprising:
- connecting an inverter of the electric drive work machine to the junction box, wherein the inverter is operatively connected to a traction motor of the electric drive work machine, and wherein a drivetrain of the electric drive work machine is connected to a traction motor output shaft of the traction motor; and
- driving the drivetrain to cause rotation of the traction motor output shaft, wherein the power source charging power generated by the traction motor and transferred by the inverter to the junction box is distributed equally to the first electric power storage device and the second electric power storage device.

15. The method for symmetrically charging in accordance with claim 10, comprising:
- connecting a charging port of the electric drive work machine to the junction box; and
- attaching an external power source to the charging port, wherein the power source charging power from the external power source transferred by the charging port to the junction box is distributed equally to the first electric power storage device and the second electric power storage device.

16. An electric drive work machine comprising:
- a body frame;
- a first electric power storage device mounted on the body frame;
- a second electric power storage device mounted on the body frame;
- a junction box mounted on the body frame, operatively connected to the first electric power storage device by a first electric connection having a first inductance, and operatively connected to the second electric power storage device by a second electric connection having a second inductance;
- an inverter operatively connected to the junction box, where the first inductance is equal to the second inductance;
- a traction motor operatively connected to the inverter and having a traction motor output shaft;
- a drivetrain operatively connected to the traction motor output shaft; and
- a first charging port operatively connected to the junction box,
- wherein power source charging power transferred from either the inverter or the first charging port to the junction box is distributed equally to the first electric power storage device and the second electric power storage device, and power source output power from transferred from the first electric power storage device and the second electric power storage device through the junction box to the inverter is drawn equally from the first electric power storage device and the second electric power storage device.

17. The electric drive work machine in accordance with claim 16, wherein the first electric power storage device and the second electric power storage device are mounted on the body frame at equal distances from the junction box, wherein a first connection length of the first electric connection is equal to a second connection length of the second electric connection and a first connection wire gauge of the first electric connection is equal to a second connection wire gauge of the second electric connection.

18. The electric drive work machine in accordance with claim 16, wherein the first electric power storage device is disposed a first power source distance from the junction box and the second electric power storage device is disposed a second power source distance from the junction box that is not equal to the first power source distance, and a first connection length of the first electric connection is equal to a second connection length of the second electric connection.

19. The electric drive work machine in accordance with claim 16, wherein the first electric power storage device is disposed a first power source distance from the junction box and the second electric power storage device is disposed a second power source distance from the junction box that is not equal to the first power source distance, a first connection length of the first electric connection is not equal to a second connection length of the second electric connection, and a first connection wire gauge of the first electric connection is not equal to a second connection wire gauge of the second electric connection so that the first inductance is equal to the second inductance.

20. The electric drive work machine in accordance with claim 16, comprising a second charging port operatively connected to the junction box, wherein, when a first external power source is connected to the first charging port and a second external power source is connected to the second charging port to deliver the power source charging power to the electric drive work machine, the power source charging power from the first external power source and the second external power source to the junction box is distributed equally to the first electric power storage device and the second electric power storage device.

* * * * *